Feb. 26, 1929.
C. E. JACKSON
POULTRY COOP
Filed April 25, 1928    2 Sheets-Sheet 2
1,703,625
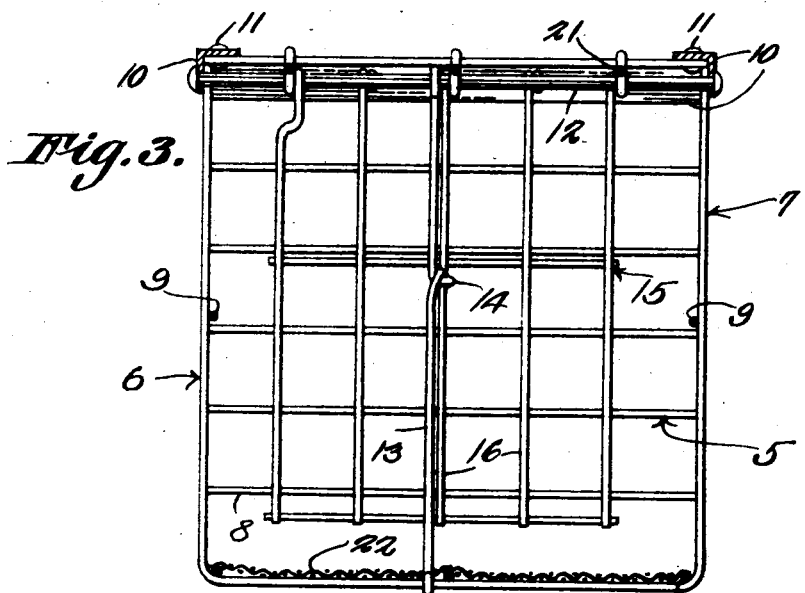
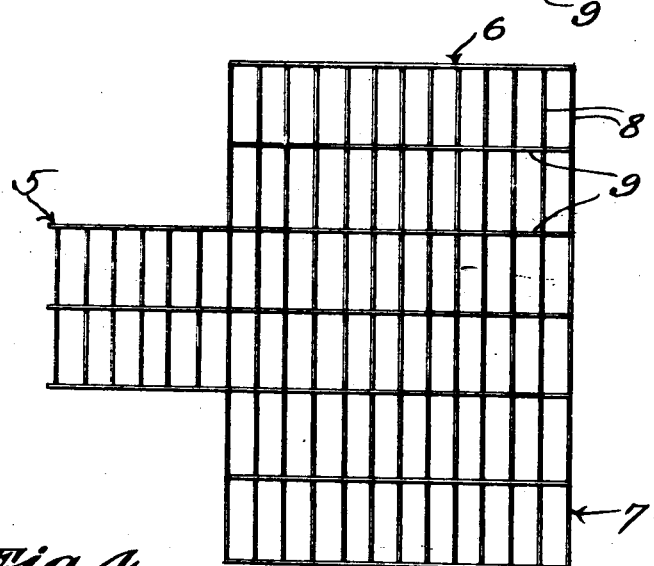
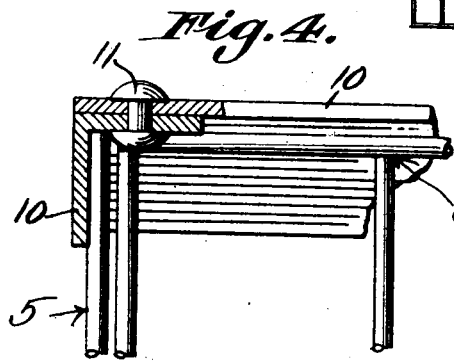
Chester E. Jackson
Inventor
By C.A. Snow & Co.
Attorneys Patented Feb. 26, 1929.

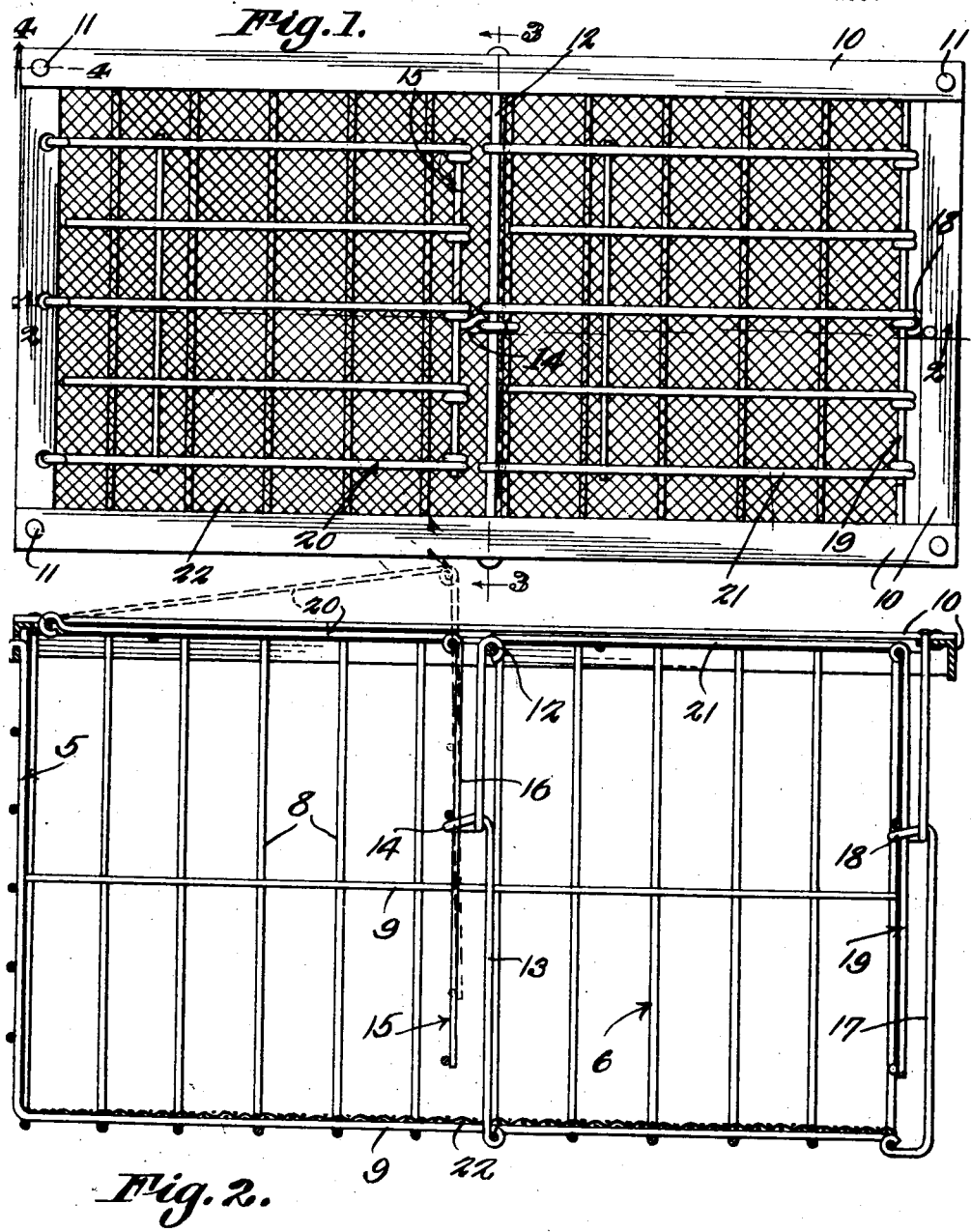

1,703,625

UNITED STATES PATENT OFFICE.

CHESTER E. JACKSON, OF OVID, MICHIGAN.

POULTRY COOP.

Application filed April 25, 1928. Serial No. 272,699.

This invention has reference to poultry coops, and aims to provide a novel form of coop in which poultry is placed during the incubating period to break them from setting.

An important object of the invention is to provide a coop of this character embodying communicating compartments separated by a movable partitioning member so that the poultry may pass from one compartment to the other, when the partitioning member has been raised.

A still further object of the invention is to so construct a partitioning member of this character that it will operate readily and easily and without binding on its guides.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:

Figure 1 is a plan view of a coop constructed in accordance with the invention.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is a diagrammatic view of the wire mesh material of which the coop is constructed.

Referring to the drawings in detail, the coop is formed by cutting portions of a rectangular piece of wire mesh material to provide an extension 5, and lateral sections 6 and 7 respectively.

The wire mesh material is constructed of parallel longitudinal wires 8 and transverse wires 9 spaced suitable distances apart to prevent the fowl in the coop from escaping therefrom.

In the formation of the coop the lateral sections 6 and 7 are bent upwardly to vertical positions and the extension 5 is bent upwardly so that its side edges contact with ends of the lateral sections 6 and 7. Angle bars 10 are secured along the upper edges of the lateral sections 6 and 7 and along the upper edges of the ends 5, the angle bars overlapping as clearly shown by Figure 4, where they are secured together by means of rivets 11, located at the ends of the angle bars.

Connecting the angle bars at the center of the coop, is a bar 12 which strengthens the coop and at the same time provides means to which the upper end of the guide wire 13 may be secured, the guide wire 13 being shown as having its upper end looped around the rod 12 at a point intermediate the ends of the rod 12, the lower end of the guide wire 13 being looped around the central wire of the bottom of the coop to the end that the guide wire 13 is rigidly held in an upright position.

This guide wire 13 is formed with a loop 14 located at a point substantially intermediate the ends of the guide wire, the loop being disposed in a horizontal plane to provide a guide for the vertical movable partition 15, which is formed with vertical wires 16, the central wire passing through the loop 14. At the forward end of the coop is another guide rod indicated by the reference character 17 which has its upper end extended through an opening in the angle bar at the front of the coop, while the lower end is looped around one of the wires 8 of the coop, as clearly shown by Figure 2. This wire 17 is provided with a loop 18 through which one of the vertical wires of the closure 19 extends, the closure 19 operating to close one end of the coop.

The top of the coop is closed by the closures 20 and 21 respectively, the closures being constructed of wire mesh material, and as shown the closure 20 has certain wires looped through openings in the angle bar at the rear of the coop while the forward ends of the wires are looped around the upper wire of the partition 15 so that as the closure 20 is moved upwardly, a free pivotal movement between the closure and partition 15 will be had to prevent binding of the partition with respect to the guide wire.

Closure 21 has certain wires looped around the rod 12, the forward end of the wires being looped around the upper horizontal wire of the closure 18, in such a way as to permit of free pivotal movement of the closure with respect to the top closure. Secured to the bottom of the coop is a length of fine wire mesh material 22 which not only provides the bottom for the coop, but defines a bottom which may be readily and easily cleaned to insure sanitation.

From the foregoing it will be seen that a fowl may be positioned in one end of the coop, and after a certain period of time, the partition between the compartments of the coop may be raised to allow the fowl to pass into another section, from where it may be released after a certain period.

While I have shown and described a coop embodying two sections, it is to be understood that the number of sections may be varied within the scope of the invention.

I claim:

1. A coop of the class described including a body portion, angle bars secured along the upper edge of the body portion, a rod connecting the angle bars on opposite sides of the body portion at points intermediate the ends of the angle bars, a guide wire connected with the rod, and having its lower end secured to the bottom of the body portion, said guide wire having a loop formed intermediate its ends, swinging closures for closing the top of the body portion, vertically movable closures connected with the first mentioned closure, and means forming a part of one of the closures and movable through the loop for guiding the closures.

2. A coop of the class described including a body portion, closures for normally closing the upper portion of the body portion, a vertically movable partitioning member pivotally connected with each closure and adapted to swing on the closure, and means for guiding the vertically movable partitioning members.

3. A coop of the class described, including a body portion, vertically movable closures for normally closing the upper portion of the body portion, vertically movable members formed of a plurality of wire members, certain of these wire members being looped around the vertically movable closures to pivotally connect the vertically movable closures and vertically movable members, and means for guiding the vertically movable members.

In testimony that I claim the foregoing as my own, I have hereto affixed my signature.

CHESTER E. JACKSON.